United States Patent [19]

Breecher et al.

[11] 4,334,775
[45] Jun. 15, 1982

[54] METHOD FOR DYNAMICALLY DETERMINING THE HORIZONTAL MOTION AND TWIST OF A MICROWAVE TOWER

[75] Inventors: Jerry D. Breecher, Worcester County, Mass.; Bruce E. Truax, Plainsboro Township, Middlesex County, N.J.

[73] Assignee: Western Electric Co., Inc., New York, N.Y.

[21] Appl. No.: 136,843

[22] Filed: Apr. 3, 1980

[51] Int. Cl.³ .............................................. G01B 11/26
[52] U.S. Cl. ..................................... 356/152; 350/6.91
[58] Field of Search ................ 356/141, 152; 350/6.91

[56] References Cited

U.S. PATENT DOCUMENTS

| | | | |
|---|---|---|---|
| 3,021,749 | 2/1962 | Merlen | 356/152 |
| 3,504,979 | 4/1970 | Stephany | 356/152 |
| 3,809,477 | 5/1974 | Russell | 356/152 |
| 4,003,626 | 1/1977 | Reinke et al. | 350/6.91 |
| 4,025,193 | 5/1977 | Pond et al. | 356/152 |
| 4,172,661 | 10/1979 | Marcus et al. | 356/152 |

FOREIGN PATENT DOCUMENTS 1528691 10/1978 United Kingdom ................ 356/152

OTHER PUBLICATIONS

J. K. Groseclose, *Civil Engineering*, Nov. 1964, pp. 68–70.

Primary Examiner—S. C. Buczinski
Attorney, Agent, or Firm—D. J. Kirk

[57] ABSTRACT

A plurality of retroreflector devices (22–23) are fixedly mounted in spaced relation on a microwave tower (10) are raster scanned with a laser beam (46). The direction of the beam (46) is monitored as it impinges on each device to determine the position of each device. The twist and sway of the tower is then determined using the positional information of the devices.

2 Claims, 21 Drawing Figures

METHOD FOR DYNAMICALLY DETERMINING THE HORIZONTAL MOTION AND TWIST OF A MICROWAVE TOWER

TECHNICAL FIELD

The invention is related to monitoring the motion of objects. In particular, the invention continuously monitors the motion of structures where the moving portion has no local, fixed frame of reference.

BACKGROUND OF THE INVENTION

The demand for telephone communication systems has substantially increased in recent years. In order to meet this demand, it is necessary that the capacity of telephone transmission links also increase. There are two well known techniques by which the system capacity can be increased, one is to physically increase the number of available channels on a transmission route and the second is to increase the bandwidth of the existing channels. In the case of microwave radio links the former technique requires building new antenna towers and/or adding more antennas to existing towers while the latter technique can be implemented by switching to a higher frequency with a wider bandwidth. The latter technique is clearly the most economical choice, however, transmission at the higher frequencies require that the movement of an antenna be maintained within predetermined limits at the microwave frequency of interest.

Such movement has been measured using conventional ground surveying equipment such as a transit or theodolite. Such techniques, while they can give a rough estimate of motion, are not suitable for dynamic measurements especially in high winds where motion of the surveying equipment may be as much of a problem as the movement of the tower.

An additional approach to the problem is disclosed in an article titled "Deflection of Tall Guyed Towers" by J. K. Groseclose in *Civil Engineering*, November 1964, pages 68 to 70. The article describes an instrument which monitors the translational motion of a tower using a ground mounted laser which directs a light beam towards the upper portion of the tower. This fixed beam is observed by a servo-driven photocell system movably mounted on the tower. Such a system requires complicated servo drive apparatus to detect the fixed beam as the tower moves.

Heretofore, estimates of tower movement under various loadings (antennas, wind, etc.) were accomplished using theoretical models since there is no empirical data available on full size towers due to the lack of equipment capable of dynamically monitoring such movement.

Accordingly, there is a need for a technique for accurately measuring the motion (e.g., horizontal motion, twist) of a microwave tower or the like.

SUMMARY OF THE INVENTION

The instant invention solves the foregoing problem of dynamically determining the movement of an object. The movement is determined by scanning a beam of light over an area in which a plurality of spaced optical devices are fixedly mounted on said object. The direction of the beam of light as it impinges on each device is monitored to determine the position of each device. The movement of the tower is then calculated using the positional information of the devices.

DETAILED DESCRIPTION

The instant invention is described in relation to measuring the movement of a microwave tower. However, such description is exemplary and for purposes of exposition and not for limitation. The instant technique clearly can be implemented to monitor the movement of various objects and structures such as buildings, bridges, or the like.

Figure 1:
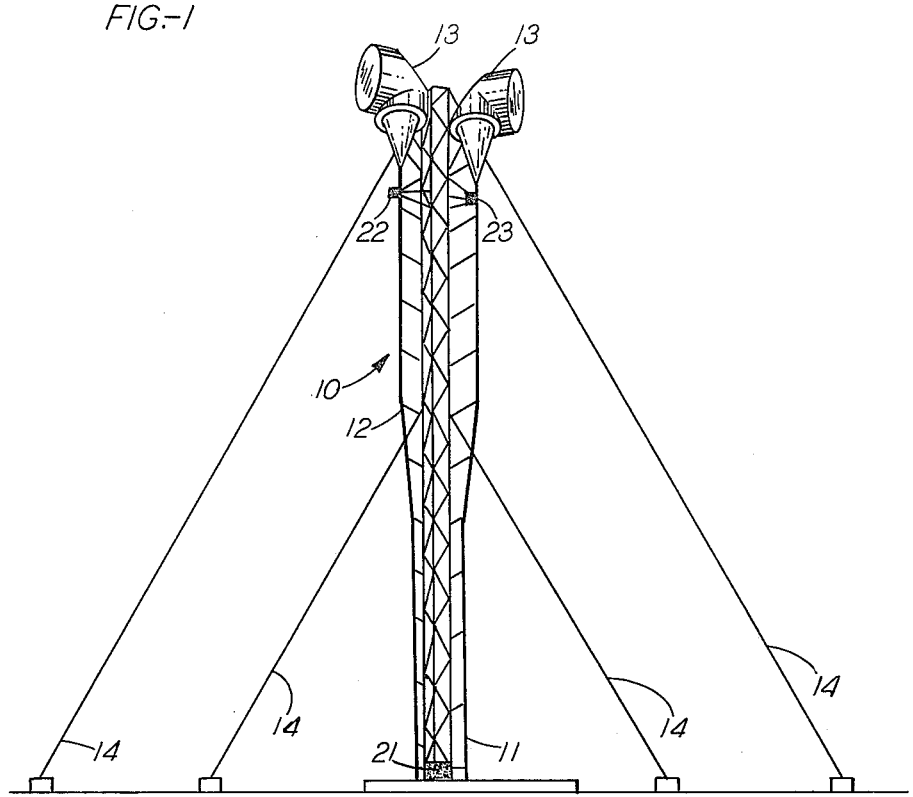
FIG. 1 is an isometric view of a microwave tower.

FIG. 1 is an isometric view of a typical microwave tower 10, which may vary in height from approximately 20 to over 100 meters. The tower 10 has a base 11, a main structural portion 12 with a plurality of microwave antennas 13—13 mounted proximate the top thereof. The tower 10 is supported by a plurality of guy wires 14—14. An optical package 21 is shown positioned proximate the base 11 while first and second retroreflective optical devices 22 and 23 are fixedly mounted on the tower 10 just below the antennas 13—13. The retroreflector devices 22 and 23 are corner cube prisms having three mutually perpendicular mirrors arranged like the corner of a cube. Such a corner-cube retroreflector reflects any incident ray back parallel to its incident direction, independent of any tilt or rotation of the cube. Such corner-tube retroreflectors are available from Rolyn Optics Co., Arcadia, Calif.

OPTICAL SYSTEM

Figure 2:
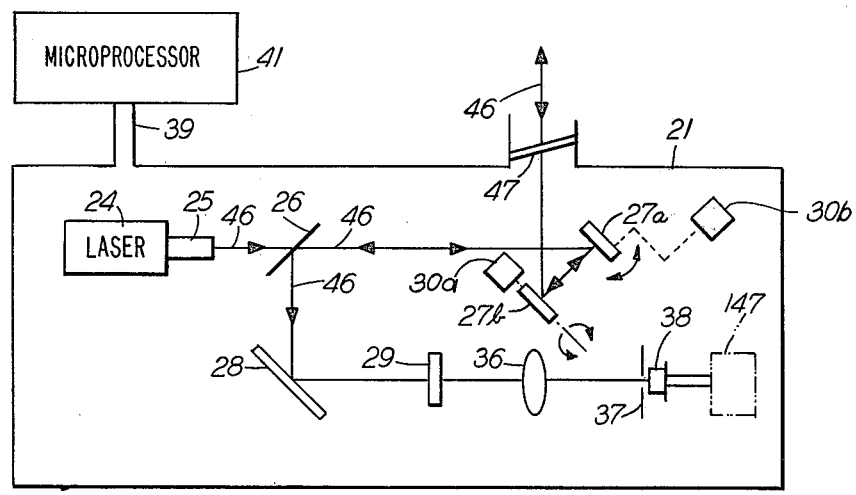
FIG. 2 is a schematic of the optics incorporated in the instant microwave tower movement monitor.

FIG. 2 is a schematic of the optical package 21 which is comprised of a laser 24, a beam expander 25, a beam splitter 26, a pair of orthogonally mounted galvonometer controlled rotatable scanning mirrors 27a and 27b controlled by galvanometer control apparatus 30a and 30b, respectively, a mirror 28, a filter 29, focusing optics 36, an apertured shield 37 and a photocell 38. The optical package 21 is electrically connected by a cable 39 to a microprocessor 41.

Figure 3:
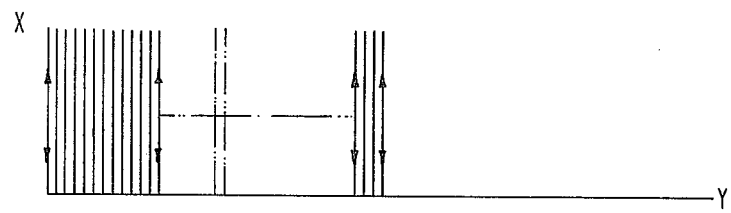
FIG. 3 shows an exemplary raster scanning pattern used to implement the instant invention.

In operation, the laser 24 (e.g., HeNe or the like) is activated to provide an expanded beam 46 of approximately one centimeter in diameter at the output of the expander 25. The beam 46 then passes through the beam splitter 26 and impinges on the rotatable scanning mirrors 27a and 27b which direct the beam through a glass window 47 in the optical package 21. The orthogonally mounted galvonometer controlled scanning mirrors 27a and 27b cause the beam 46 to raster scan in a well known manner. FIG. 3 is a typical raster scan taken in a plane substantially normal to the vertical axis of the tower 10. The beam 46 moves a predetermined distance in the "X" direction and then returns to the "Y" axis and steps along the "Y" axis to a second position, moves in the "X" direction and returns to the "Y" axis. This sequence is repeated over a predetermined distance along the "Y" axis to include the area in which the retroreflectors 22 or 23 should be located. When the scanning beam 46 strikes one of the retroreflectors 22 or 23, a pulse of reflected light is directed back towards the optical package 21 over the original path and a portion thereof is reflected by the beam splitter 26 onto the mirror 28. The mirror 28 reflects the beam 46 through the filter 29 and the focusing optics 36 which directs the beam through the apertured shield 37 onto the photocell 38. The direction of the light beam 46 is monitored by converting the light pulse impinging on the photocell 38 into an electrical pulse which, in turn, causes the direction of the beam to be ascertained by causing the positions of the scanning mirrors 27a–27b to be forwarded to the microprocessor 41 as will hereinafter be described. With the position information, the microprocessor 41 calculates the position of the scanned retroreflector 22 or 23. The scanning of the beam 46 continues until the location of the second retroreflector 22 or 23 is determined in a similar manner. Once the positional information of both of the retroreflectors 22 and 23 has been determined the movement of the tower 10 may be mathematically determined as will hereinafter be described.

Figure 4:
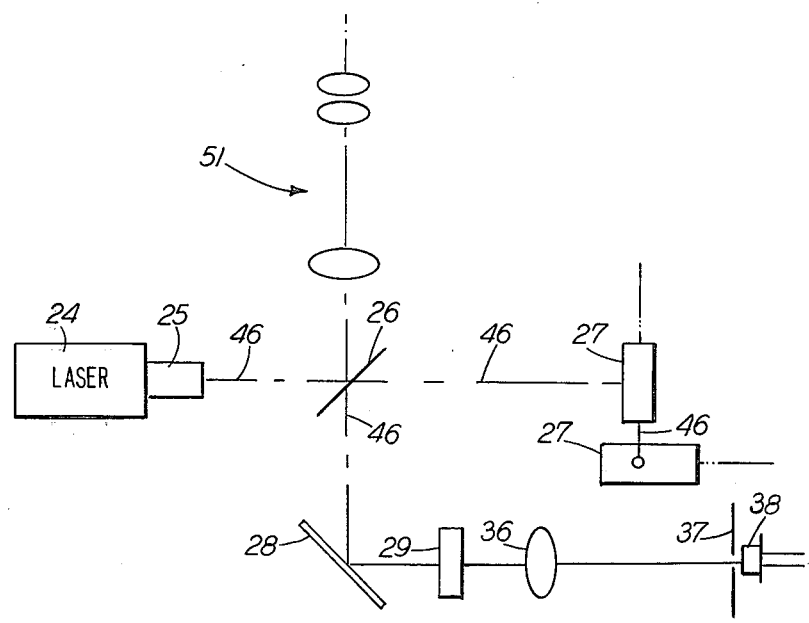
FIG. 4 is an optical schematic representation of a technique used to align the instant system.

The optical system 21 is initially aligned, as shown in FIG. 4, by using a telescope 51. In particular, a 6–18 power, zoom Redfield rifle scope was used and set up so that upon viewing therethrough the cross-hairs therein indicate the position of the laser beam 46. The filter 29, which is highly reflective at all wavelengths except a one nanometer passband having a center frequency at about 632.8 nanometers, acts as a mirror to all other frequencies. The optical path for the alignment system is such that the viewer, looking into the telescope 51, sees the light which is reflected from the scanning mirrors 27—27 which are stationary during alignment, off the beam splitter 26, and mirror 28 and reflected back by the filter 29 into the alignment telescope 51. When aligned properly the optical axis of the alignment telescope 51 and the laser beam 46 coincide.

Use of two retroreflectors 22 and 23, separated by some known distance (e.g., 3.5 meters) is required inasmuch as a single retroreflector does not provide sufficient information to distinguish vertical and horizontal angle variations. Knowing the relative positions of the two retroreflectors 22 and 23 mounted in the same plane and the effective cantilever point for the vertical angle variations; both motions can be monitored.

Figure 5:
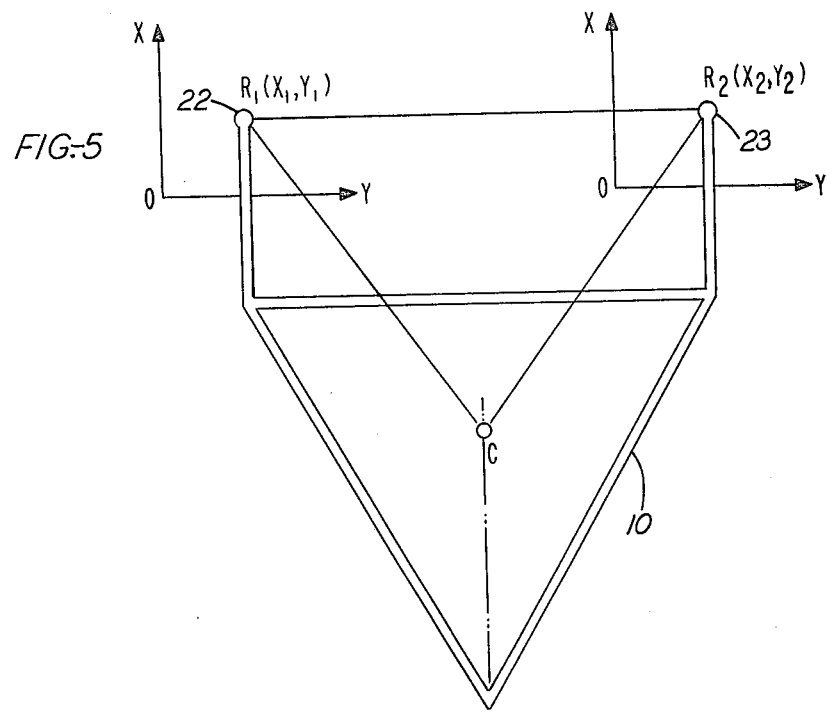
FIG. 5 is a cross-sectional view of a microwave tower depicting the relationship between the tower and retroreflectors thereon.
Figure 6:
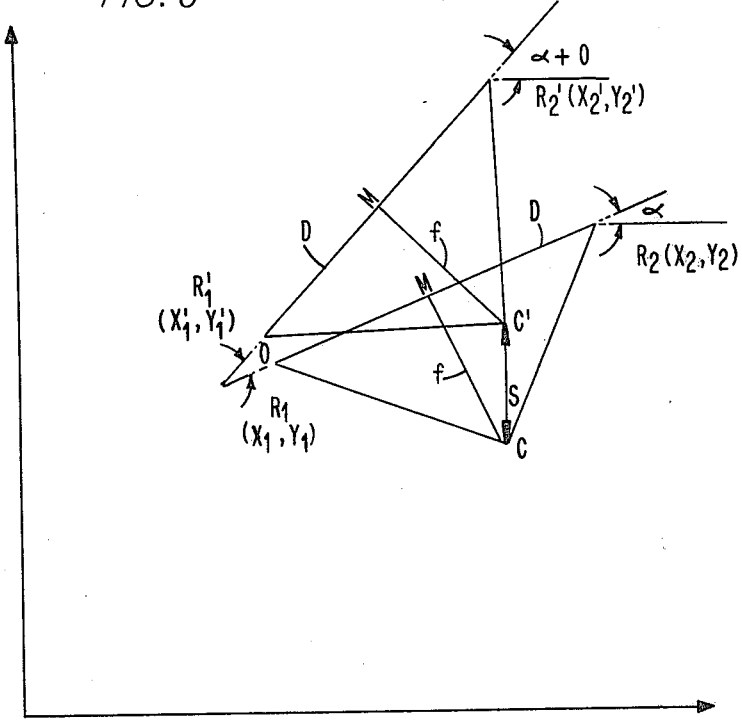
FIG. 6 depicts the relationship of variables used to calculate twist and sway of the tower.

The calculation of the twist is relatively simple and can be easily visualized by referring to FIGS. 5 and 6. Schematically points $R_1$, $R_2$ and C represent the two retroreflectors 22 and 23 and a point on the centerline of the tower 10, respectively, all in a horizontal plane, in their initial undisturbed position. Points $R_1'$, $R_2'$ and $C'$ represent the tower 10 at a later time after undergoing both twist through an angle $\theta$ as well as tilt. The simplest method for finding $\theta$ is to find the two angles which line segments $R_1R_2$ and $R_1'R_2'$ make with a vertical plane and then subtract them.

The angle which line segment $R_1R_2$ makes with the Y-axis is $$\alpha = \sin^{-1}\left(\frac{X_2 - X_1}{D}\right). \quad (1)$$

Where D is the separation of the retroreflectors 22 and 23. Similarly the angle which line segment $R_1'$ $R_2'$ makes with the Y-axis is $$\alpha + \theta = \sin^{-1}\left(\frac{X_2' - X_1'}{D}\right). \quad (2)$$

These two equations can then be combined to give $\theta$:

$$\theta = \sin^{-1}\left(\frac{X_2' - X_1'}{D}\right) - \sin^{-1}\left(\frac{X_2 - X_1}{D}\right). \quad (3)$$

The calculation of the tilt angle of the tower is done in two steps. First the magnitude S of the lateral motion of the tower must be found and second the tilt angle is found by taking the arctangent of the motion S divided by the effective lever arm length h. As an example the lever arm length on a guyed tower would be the distance from the top guy level to the level of the retroreflectors 22 and 23.

To calculate the magnitude of S it is necessary to determine the coordinates of the centerline of the tower 10 in both the undisturbed and disturbed position. Referring to FIG. 6, the centerline of the tower in its initial position is given by C and after a displacement S and twist $\theta$ it is represented by $C'$. The points M and $M'$ are the midpoints of $R_1R_2$ and $R_1'R_2'$, respectively. If the length of the line segments CM and $C'M'$ is given by f, then the coordinates of points C and $C'$ are given by $$(X_C, Y_C) = \left(\frac{X_1 + X_2}{2} - (\cos\alpha)f, \frac{Y_1 + Y_2}{2} + (\sin\alpha)f\right) \quad (4)$$

and $$(X_{C'}, Y_{C'}) = \left(\frac{X_1' + X_2'}{2} - (\cos(\alpha + \theta))f,\right.$$

$$\left.\frac{Y_1' + Y_2'}{2} + (\sin(\alpha + \theta))f\right). \quad (5)$$

The magnitude of S can be found using $$S = \{(X_C - X_{C'})^2 + (Y_C - Y_{C'})^2\}^{\frac{1}{2}} \quad (6)$$

Substituting Eqs. 4 and 5 into Eq. 6 gives $$S = \quad (7)$$

$$\left\{\left[\frac{(X_1 - X_1') + (X_2 - X_2')}{2} - f(\cos\alpha - \cos(\alpha + \theta))\right]^2 + \right.$$

-continued $$\left[\frac{(Y_1 - Y_1') + (Y_2 - Y_2')}{2} + f(\sin\alpha - \sin(\alpha + \theta))\right]^2\right\}^{\frac{1}{2}}.$$

Using the following substitutions $$\Delta X_1 = X_1 - X_1' \quad \Delta Y_1 = Y_1 - Y_1' \quad (8)$$
$$\Delta X_2 = X_2 - X_2' \quad \Delta Y_2 = Y_2 - Y_2'$$

equation 7 reduces to $$S = \left\{\left[\frac{\Delta X_2 + \Delta X_1}{2} - f(\cos\alpha - \cos(\alpha + \theta))\right]^2 + \left[\frac{\Delta Y_2 + \Delta Y_1}{2} + f(\sin\alpha - \sin(\alpha + \theta))\right]^2\right\}^{\frac{1}{2}}. \quad (9)$$

The tilt of the tower 10 is then expressed by:

$$\theta = \tan^{-1}\left(\frac{S}{h}\right). \quad (10)$$

The interesting feature of these equations is that it is possible to use separate coordinate systems for each of the retroreflectors 22 and 23 as long as the units are equivalent and the two Y-axes are collinear.

Advantageously, by using two separate coordinate systems the architecture of the electronics used provides much greater measurement resolution than a single coordinate system. To understand this it is necessary to explain further the electronics controlling the scan of the laser beam 46. The scan format used is a type of raster scan where a first mirror 27a is oscillating sinusoidally at about 250 Hz and the second mirror 27b, positioned orthogonally to the first mirror, steps linearly once every cycle for 256 steps at which point the second mirror returns to its original position as shown in FIG. 3. The first scanning mirror 27a scan forms the X-axis and the stepping mirror 27b forms the Y-axis. When the laser beam 46 strikes one of the retroreflectors 22 or 23, the positions of the two scanning mirrors 27a and 27b are sampled by monitoring the galvanometers (not shown) which control them. The positions of the mirrors 27a and 27b are converted into two digital words 8-bits in length (256 levels). Since it is desirable to have equal resolution in both axes, the scan itself is confined to be square. If a square scan is to cover two moving retroreflectors 22 and 23, 3.5 meters apart, it should be at least 4 meters square which gives a resolution of approximately 1.5 cm. When 1.5 cm is substituted into equation (3) $\theta=0.25$ which is as large as the motion to be measured.

If instead, two smaller coordinate systems are used, one centered about each retroreflector 22 and 23, as shown in FIG. 5, then the resolution can be increased significantly. For example, two 1.5 meter square coordinate systems would have a unit square size of approximately 0.6 cm which is equivalent to a $\theta$ of 0.1°. The two coordinate systems are formed by changing the D.C. bias on the galvanometer controlling the stepping mirror 27b which forms the Y-axis. Such a technique satisfies the requirements hereinbefore described for multiple coordinate systems, they have the same size unit square, the X-axes are parallel and the two Y-axes are collinear.

ELECTRONICS

In an exemplary embodiment, the instant system uses a Motorola M6800 microprocessor 41 (see FIG. 7) to control and synchronize its various functions. In addition to the microprocessor 41, there are 512 8-bit words of random access memory and the capability to accept 16k words of read only memory.

Figure 7:
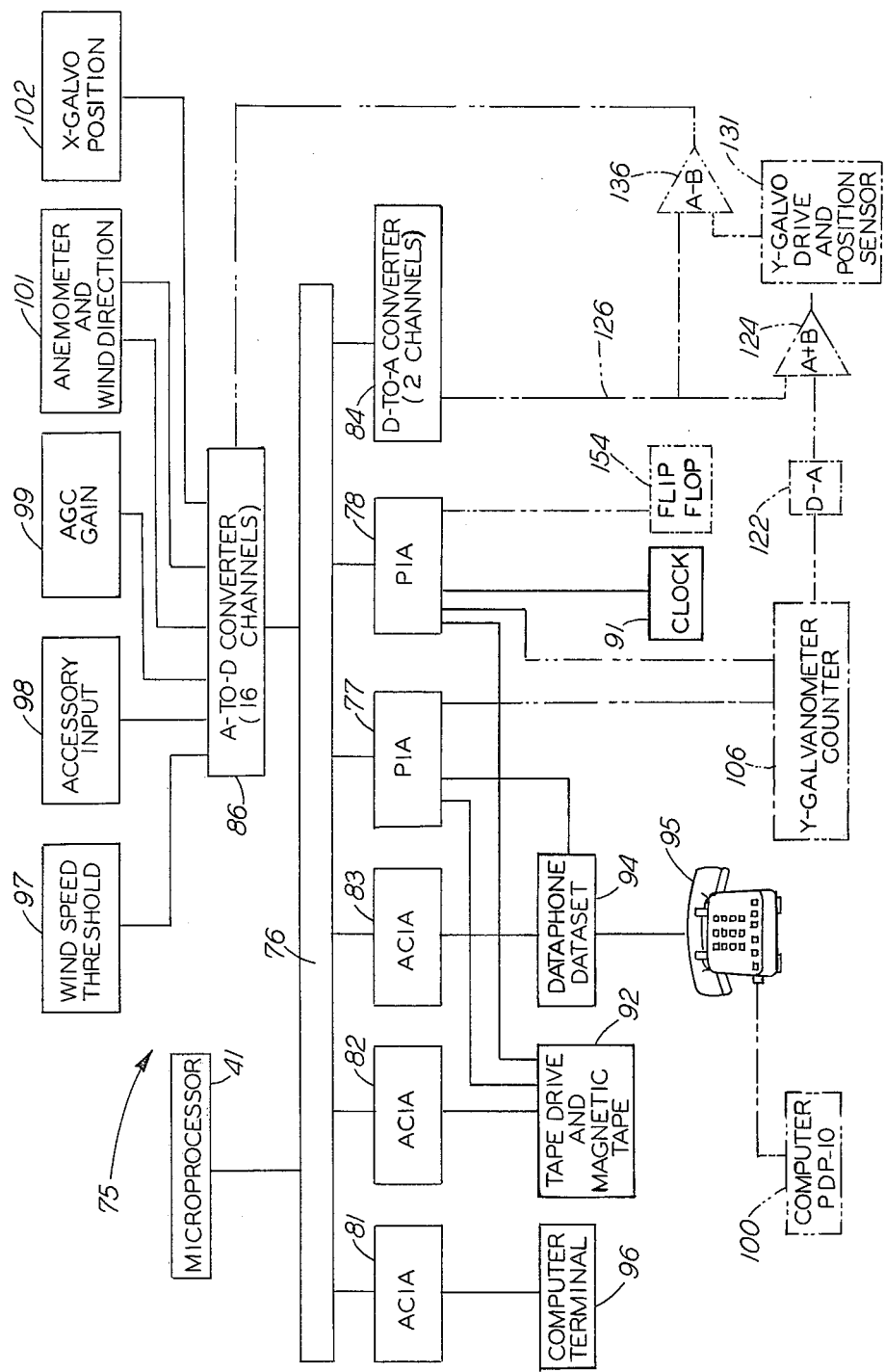
FIG. 7 is a diagrammatical representation of a microprocessor bus system.

FIG. 7 depicts an interface and control system 75 to facilitate input/output connections. The microprocessor 41 is connected, by a bus 76 to a first and second Peripheral Interface Adapters (PIAs) 77 and 78, respectively, each of which has 18 input/output lines, three Asynchronous Communications Interface Adapters (ACIAs) 81, 82 and 83, a digital-to-analog (D-to-A) converter 84 with two channels and one sixteen channel analog-to-digital (A-to-D) converter 86. The PIAs 77 and 78 and the ACIAs 81 to 83 may be purchased from MOTOROLA Semiconductor Products, Inc., under the code numbers MC6820 and MC6850, respectively. The PIAs 77 and 78 provide a universal means of interfacing peripheral equipment to the MC6800 Microprocessor 41. The ACIAs 81 to 83 provide the data formatting and control to interface serial asynchronous data communications information to the microprocessor 41.

The peripheral equipment attached to these input/output ports consists of a day/date electronic clock 91, a magnetic tape and tape drive 92, a Dataphone dataset 94 (trademark of American Telephone and Telegraph Company), a telephone 95 and a computer terminal 96. Additional inputs to the converter 86 include a wind speed threshold circuit 97, an accessory input 98, Automatic Gain Control (AGC) gain 99, anemometer and wind direction input 101 and X-galvanometer position circuit 102.

The microprocessor 41 performs a number of functions, it must sequence and control the positions of the mirrors 27a and 27b, read and record all of the data, format the data for output to a terminal and allow the system to be interfaced with a computer 100 (shown in phantom) which may be located locally or at a remote location.

Figure 8:
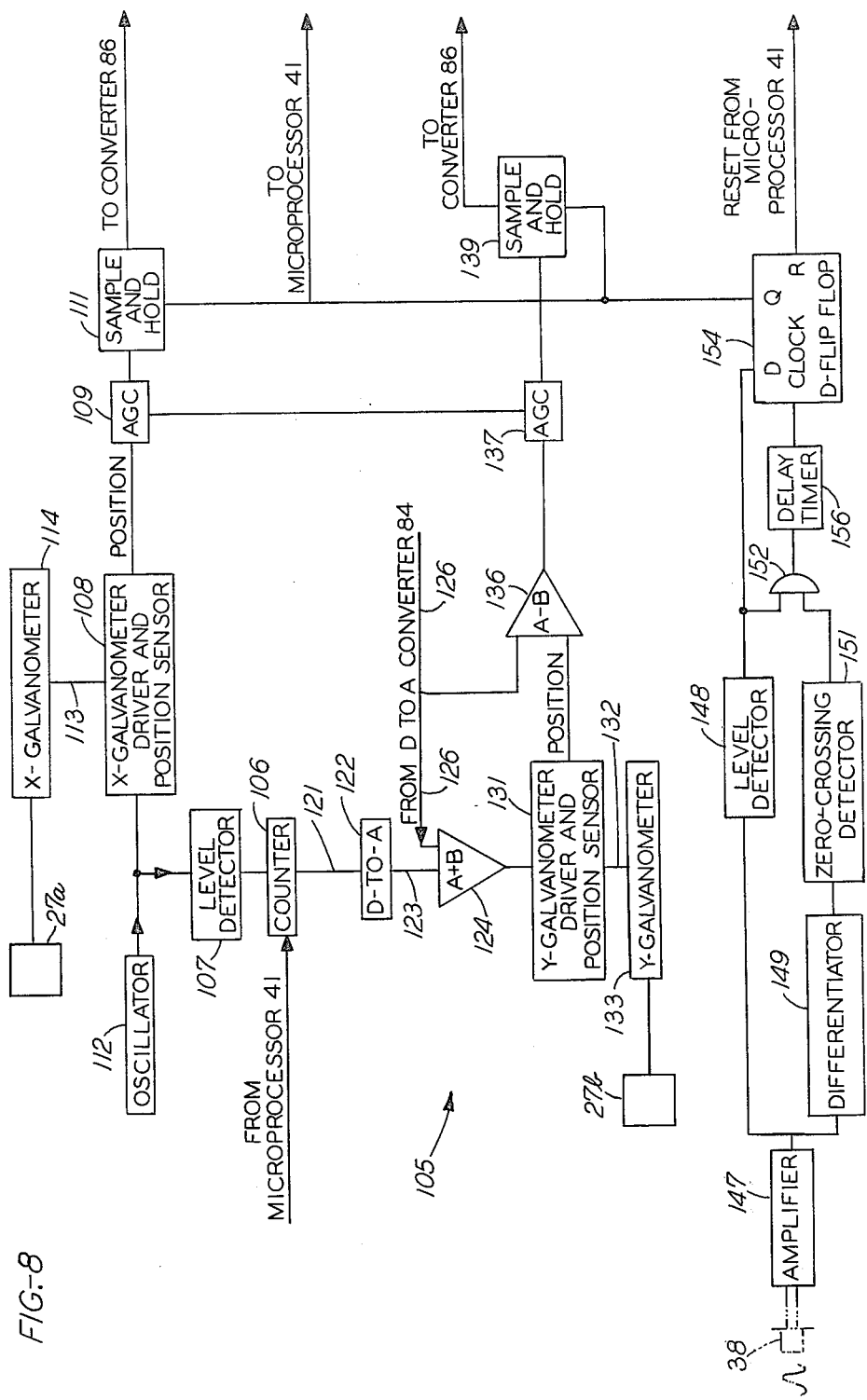
FIG. 8 is a block diagram of electronic apparatus used to implement the instant invention.
Figure 9:
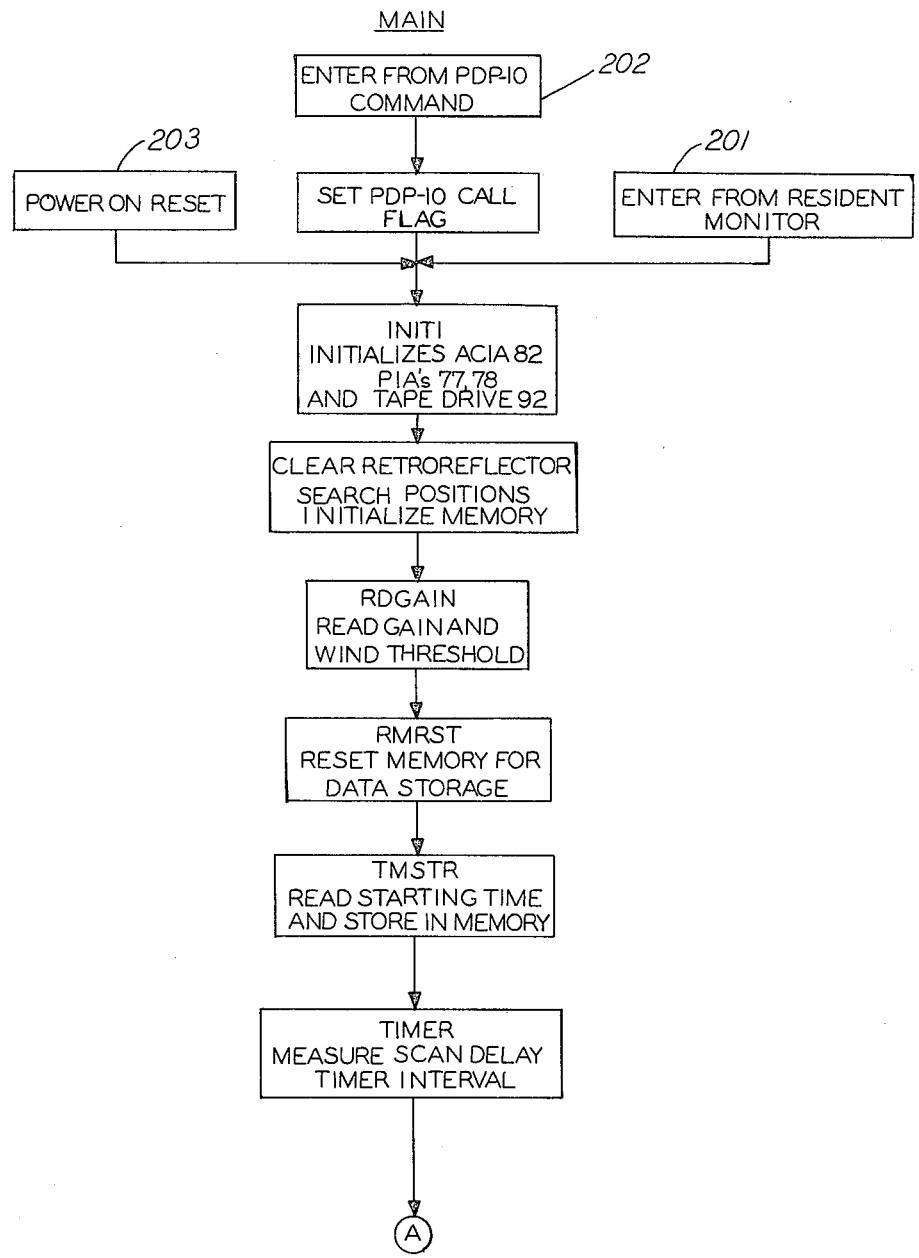
FIGS. 9 to 12 is a flowchart of a "MAIN" program used to implement the instant invention.

A block diagram of the retroreflector locating electronics 105 is shown in FIG. 8. Portions of the circuitry in FIG. 8 are also shown in dashed line blocks in FIG. 7 to clearly depict the relationship therebetween. The electronics 105 are comprised of a counter 106 connected to the serial combination of a first level detector 107, an X-galvanometer driver and position sensor circuit 108, a first Automatic Gain Control (AGC) circuit 109 and a first sample and hold circuit 111. Additionally, an oscillator 112 is connected to an input of the circuit 108 which also has a connection 113 to an X-galvanometer 114 which controls the movement of the mirror 27a. The counter 106 forwards information over connection 121 to a D-to-A converter 122. The converter 122 has an output 123 connected to a summing amplifier 124 which also has an input 126 from the D-to-A converter 84.

The output of the summing amplifier 124 is connected to a Y-galvanometer and position sensor circuit 131 which has a first output connection 132 to a Y-galvanometer 133, which controls the movement of mirror 27b, and a second output connection 134 to a differential amplifier 136 which has an output connected to a second AGC 137. The second AGC 137 is connected to both the first AGC 109 and a second sample and hold circuit 139.

Additionally, the photocell 38 (also see FIG. 2) is connected to an amplifier 147 having an output connected to a second level detector 148 and the serial combination of a differentiator circuit 149 and a zero crossing detector 151. The output of detectors 148 and 151 are input to "AND" gate 152 which has an output 153 connected to a flip-flop 154 via a delay timer 156. The detector 148 is also connected directly to the "D" input of flip-flop 154. The "Q" terminal of the flip-flop 154 is connected to both the first and second sample and hold circuits 111 and 139, respectively. Connections are made to the microprocessor 41 from the sample and hold circuits 111 and 139 as well as from the flip-flop 154. A reset lead from the microprocessor 41 is connected to the reset input "R" of flip-flop 154.

In operation, the galvonometers 114 and 133 are driven to produce the raster type of scan pattern (shown in FIG. 3) by a 250 Hz oscillator 112. The oscillator 112 drives the X-axis galvanometer 114 directly and the Y-axis galvanometer in a staircase fashion through the level detector 107, the counter 106 and the D-to-A converter 122 which takes one step per oscillation. The counter 106 can be reset and loaded by the microprocessor 41 through the lines on PIA 77 and PIA 78. This capability increases data acquisition speed to more effectively 'freeze' the motion of the tower 10. By preloading the counter 106 closer to the position of the retroreflectors 22 and 23 much of the search time can be eliminated. In addition to the staircase voltage from the D-to-A converter 122, a bias voltage "B" from one of the channels of the D-to-A converter 86 is added to the Y-axis signal, "A", in the summing amplifier 124. This allows the scan to be positioned over either of the two retroreflectors 22 or 23 as mentioned previously.

The two galvanometer driver and position sensing circuits 108 and 131 each output a voltage proportional to the angular deflection of the X-galvanometer 114 and Y-galvanometer 133, respectively. The Y-axis position signal must be corrected by subtracting out the D.C. bias voltage "B" introduced previously. After correcting the Y-axis signal, both position signals are processed by the first and second AGC circuits 109 and 137, respectively, to maintain the peak-to-peak excursion of the two signals at 10 volts. The AGC circuits 109 and 137 ensure that the full range of the analog-to-digital converter 86 is being used. To make it possible to calculate the position of the retroreflectors 22 and 23, the gain of the position sensing amplifiers must be known. To obtain this information, the control voltage from the AGC gain circuit 99 is input to the microprocessor 41 through one channel of the A-to-D converter 86. Following the AGC's 109 and 137, the two analog sample and holds 111 and 139 sample the position signals of the galvanometers 114 and 133 and holds the information while the microprocessor 41 reads the voltages.

The sample and holds 111 and 139 are triggered by the flip-flop 154 which is set just after the peak of the detector pulse. The peak of the pulse of laser light detected by the photocell 38 is determined by differentiating the signal in the differentiator 149 and feeding it to the zero crossing detector 151. The output of the zero crossing detector 151 triggers the delay timer 156 which has an adjustable delay from 2 to 128 $\mu$s. Upon timing out, the delay timer 156 triggers the flip-flop 154. The purpose of the delay timer 156 is to allow the sampling pulse to be delayed by the same amount as the X-axis galvanometer position signal which suffers a phase delay in the processing circuitry. The output of the flip-flop 154 is also used to inform the microprocessor 41 that data is present at the sample and hold circuits 111 and 118. Once the data has been read by the microprocessor 41, the flip-flop 154 is reset by a pulse from the microprocessor via the PIA 78.

In addition to reading the position of the retroreflectors 22 and 23, the time, date, wind-speed, wind-direction, Automatic Gain Control voltage and an accessory input are also recorded. The time and data are kept by a Heathkit Model 6C-1092D digital clock 91.

The wind speed, wind direction, accessory input and Automatic Gain Control voltage are all analog voltages and can be input directly to the A-to-D converter 86. The anemometer 101 interfaces reily with the A-to-D converter 86 since it is simply a D.C. generator whose output varies from 0 to 10 volts in winds from 0–140 mph. Since the A-to-D converter 86 only goes to 30 volts, the output of the anemometer 101 is connected to a voltage divider (not shown) to keep it within range. The wind direction indicator 101 is a linear potentiometer which has its center wiper connected to the A-to-D converter 86. Five volts is then applied to the potentiometer as a reference voltage. The accessory input is designed to take any $-5$ to $+5$ volt signal with the intention that a suitable interface can be designed to allow recording of any desired signal. Finally the controlling voltage from the AGC 109 is directly connected to the A-to-D converter 86.

Once all of this information has been read and stored in memory of the microprocessor 41, the microprocessor pauses for a preset time interval, checks the wind speed and continues measuring if the speed is greater than a threshold value. Both the time interval and the wind speed threshold may be adjusted by the use of adjustable potentiometers in a well known manner. The time interval length is variable from 0.1 to 8.0 seconds. The wind speed threshold provided by a center tapped potentiometer with an output of from 0 to $+5$ volts. The center tap is connected to the A-to-D converter 86 and to test the threshold, the value at this A-to-d port is compared with the value of the output of the anemometer 101.

As the data is being accumulated it is stored in the random access memory of microprocessor 41 until its 384 memory words are full. At this point the software formats the data and it is written into a file on a magnetic tape of the tape and tape drive 92 which is controlled by lines from the PIAs 77 and 78 which are connected directly to the tape drive 92, no interface is needed. Data is transferred to and from the tape drive 92 in bit-serial format at 48,000 bits per second by the ACIA circuit 82.

An additional piece of peripheral equipment which is interfaced with the microprocessor 41 is the (Western Electric Co. Model 212A) Dataphone dataset 94 which permits information and commands to be sent between the remote host computer 100 and the motion measuring system 75. The Dataphone dataset 94 is connected to operate in a low speed mode of 30 characters per second and is capable of operation at 120 characters per second if the host computer 100 also has the capability. The Dataphone dataset 94 is connected to the microprocessor 41 by two lines from PIA 77 and the two lines from the ACIA 83. The lines from the PIA 77 inform the microprocessor 41 when the telephone 95 is ringing and when the Dataphone dataset 94 is ready to send data while the ACIA 83 sends and receives the data from the Dataphone telephone interface.

SOFTWARE

The instant measuring system may be implemented with electro-mechanical apparatus and the required calculations performed manually. However, it has been found to be much more efficient to control the operation of the instant apparatus with a computer in order to take full advantage of the high speed, repetitive capabilities thereof. The computer software not only runs the measuring system, it also handles the host computer interface, handles transfer of data to the host computer 100 and reduces the data to a more meaningful form. In total there are a number of programs and subroutines used in the instant system. However, for purpose of clarity, only the major program flow diagrams and descriptions will be given to inform one of ordinary skill in the art of the system operation. The required support programs and subroutines can be readily developed by one skilled in the programming art based upon the functional description herein set forth.

The capitalized characters at the top of some of the flow chart blocks in FIGS. 9 to 21 are the names of the subroutines which perform the described function. The program which controls the instant measuring system when it is in the measurement mode is named MAIN and its flow diagram is shown in FIGS. 9 to 12. There are three ways to enter the MAIN, the first is locally from the resident monitor 201, the second is by way of the command MAIN 202 from the host computer 100 and the third is by a start up sequence after a power failure 203. The monitor and start up entries are similar while the host computer entry is modified to send the host computer notification once the optical package 21 begins to take measurements. The first set of operations that MAIN performs is to initialize the lines of PIA 77 and PIA 78 as inputs or outputs, initialize the tape drive ACIA 82 and finally to position the magnetic tape at the beginning of the first empty file. At this point the microprocessor 41 (see FIG. 7) reads a set of status information consisting of the starting date and time, wind speed threshold, AGC gain and the length of the time interval between readings. This information will be formatted and stored on the magnetic tape, in what is known as a header file, just before the first measurements are taken.

Figure 10:
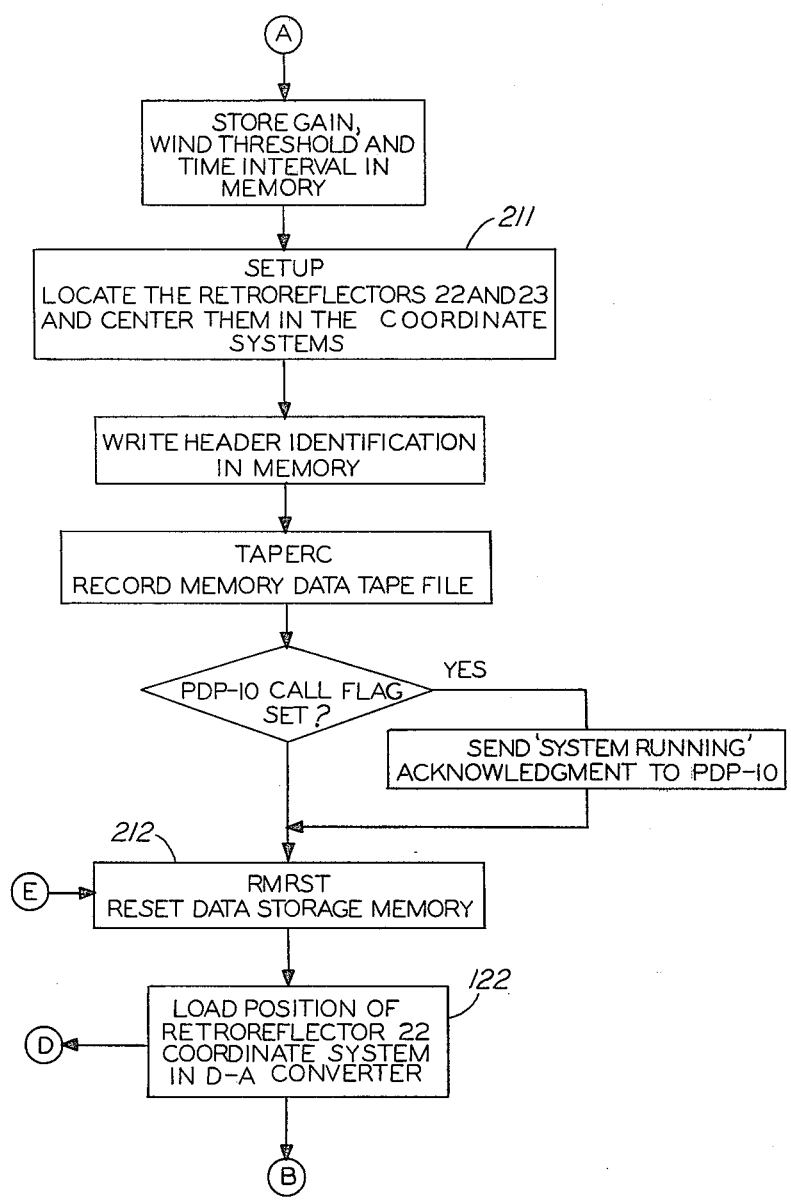
Figure 11:
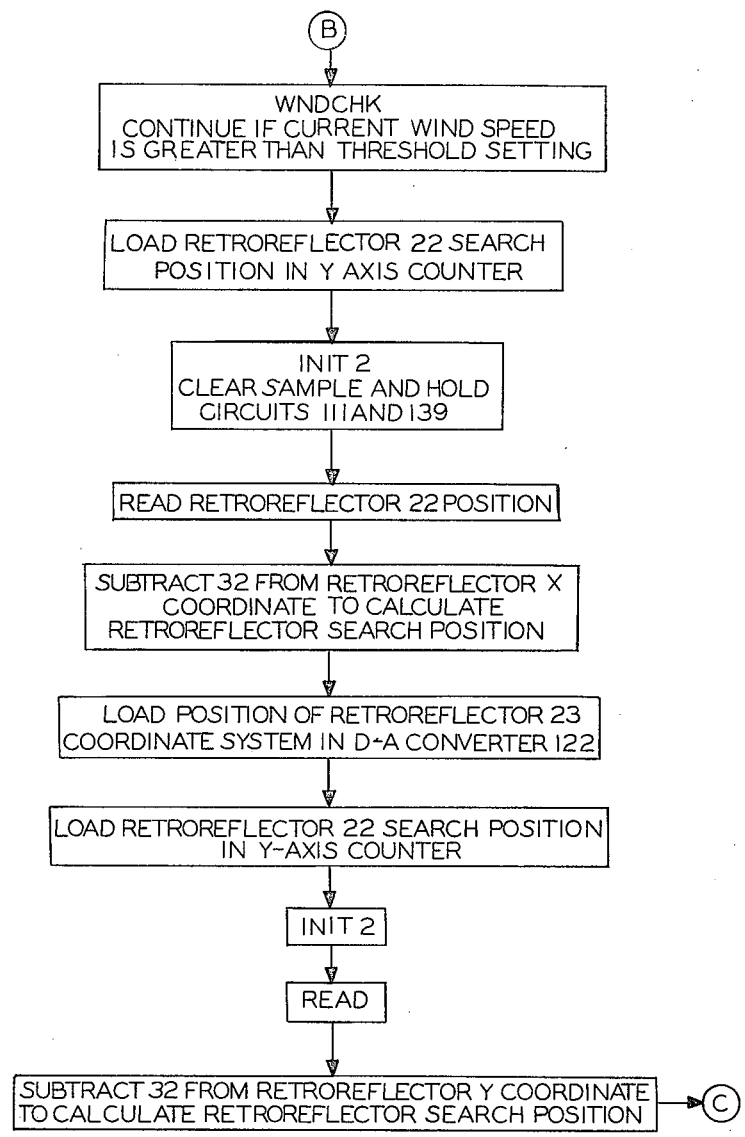

Before measurements of the positions of the retroreflectors 22 and 23 can begin, two coordinate systems indicated in FIG. 5 must be established by the subroutine SETUP 211 shown in FIG. 10. What SETUP does is slowly step the laser scan across the field until the locations of the two coordinate systems have been found and stored. Once SETUP is completed the header file is stored on magnetic tape and if necessary the host computer 97 is informed that measurements will soon commence.

Measuring the position of the retroreflectors 22 and 23 can be accomplished by two different techniques. The first technique is to position the scan at the origin of one of the coordinate systems in FIG. 5 by adding the correct D.C. bias "B" to the Y-axis galvanometer driver 131 and setting the Y-axis counter 106 to zero. The beam 46 shown in FIG. 2 is then allowed to scan freely in the raster pattern indicated in FIG. 3 until the retroreflector 22 is struck at which point the positions of the X-galvanometer 114 and the Y-galvanometer 133 are read and recorded, as shown in FIG. 8. The measurements obtained by this technique tend to vary considerably due to the finite sizes of the laser beam 46 and the retroflectors 22 and 23. To improve on these measurements an averaging technique can be used. This technique allows the laser beam 46 to scan over a retroreflector 22 and X, Y coordinates are recorded for each strike. This continues until one complete oscillator occurs without a strike. At this point the X and Y readings are averaged to give the coordinates of the scanned retroreflector 22. The averaged position readings are both more consistent (variation of no more than 1 A-to-D level) and more accurate.

Additionally, the Y-axis counter may be preloaded with a value slightly less than the position of the retroreflector 22 thereby reducing the search time considerably. The procedure for calculating the preload value is quite straightforward. Since both the D-to-A converter 122 which drives the galvanometer 133 and the A-to-D converter 86 which reads the position have 256 levels, if value is loaded into the D-to-A converter it should produce a value very close to it at the A-to-D converter 86. If this assumption is valid and it is also assumed that the retroreflector 22 does not move significantly between readings, then the preload value can be found by subtracting a constant value from the previous Y-axis coordinate. The purpose of subtracting a constant is to take into account any Y-origin. This software speed-up technique works quite well, regarding the time needed to measure the position of the two reflectors 22 and 23 from one second to about one quarter second.

Figure 12:
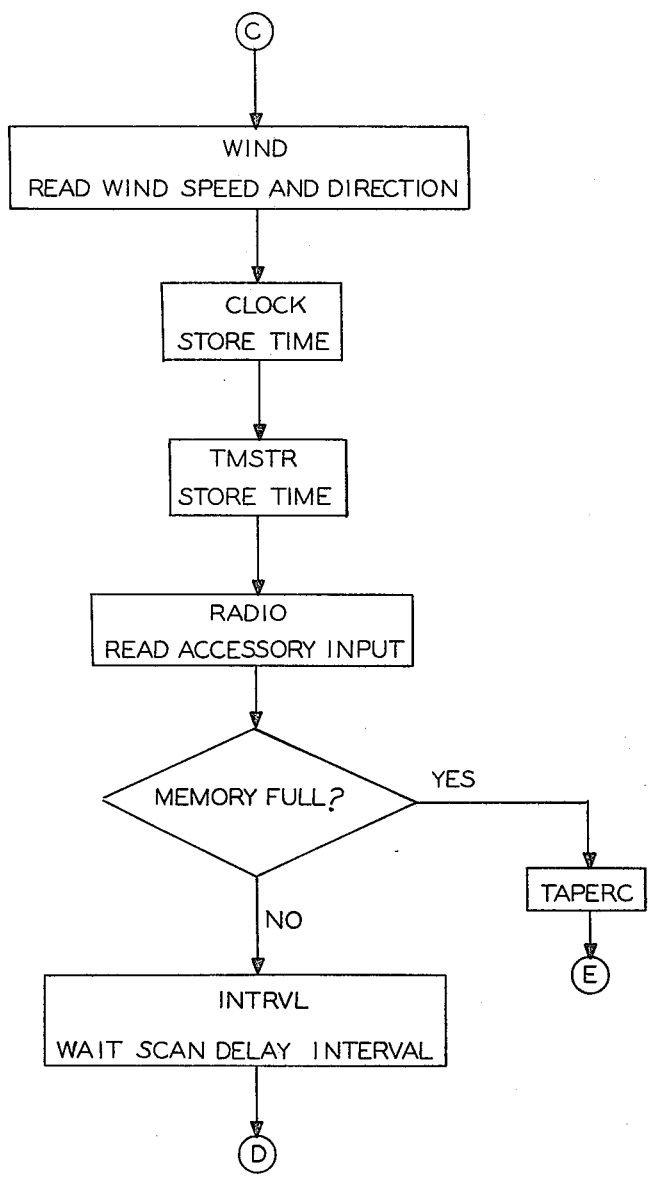

The section in MAIN which performs these measurements begins at RMST routine 212 which resets the data storage memory (FIG. 10) and moves the scan to the first retroreflector 22. The wind speed is checked (FIG. 11) and if it is above the preset threshold the Y-axis counter is loaded with an estimated position (on the first time through the counter is loaded with zero). Once the retroreflector 22 has been located (FIG. 11), the scan is shifted to the other retroreflector 22, the counter 106 is loaded and the position of the other retroreflector is measured. After the coordinates of the two reflectors 22 and 23 have been calculated, the wind speed, wind direction, time and the accessory port are read as indicated in FIG. 12. If, after storing this data, the memory is full its contents are written onto the tape, otherwise the process continues and another set of measurements is taken.

Figure 13:
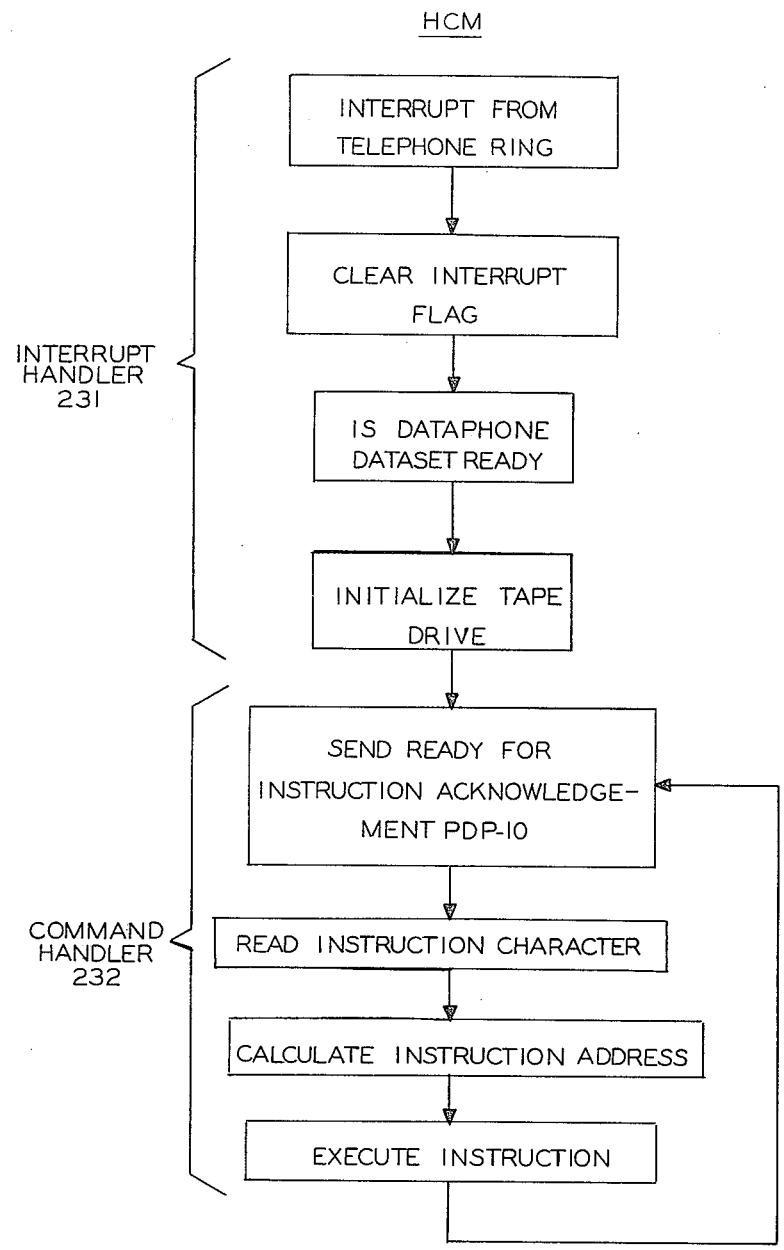
FIG. 13 is a flowchart of the "HOST COMPUTER MONITOR" program.

Once the data has been formatted and stored on the magnetic tape, it can be printed out and examined in one of two ways via either the resident monitor program or the host computer 100. The resident monitor is a commercially purchased program from Wintex Corporation. Communications with the host computer 97 use a second monitor consisting of two parts, an interrupt handler 231 and a command handler 232. The flow chart for the Host Computer Monitor (HCM) is shown in FIG. 13. This program is entered by way of an interrupt vector generated when the telephone 95 rings. Once the Dataphone dataset 94 has completed the connection, the tape drive 92 is initialized and the program jumps to the command handler 232. The command handler acknowledges by sending a character to the host computer and then waits for an instruction. The instructions consist of numbers from 0-9 which, when received are used to calculate the address of the program which will execute the instruction. Upon completion of the instruction, control is returned to the command handler 232 except in the case of the MAIN or STOP commands. The MAIN command starts the measurement routine and STOP returns control to the resident monitor. The other commands are ERASE (FIG. 17) (to erase the magnetic tape), CTFLS (FIG. 16) (to count the files on the tape) and RDFLS (FIG. 18) (reads the data files on the tape and sends them to the host computer). When control is returned to the command handler 232 (FIG. 13) it again acknowledges by sending a character to the host computer 100 and waits for the next instruction.

Figure 14:
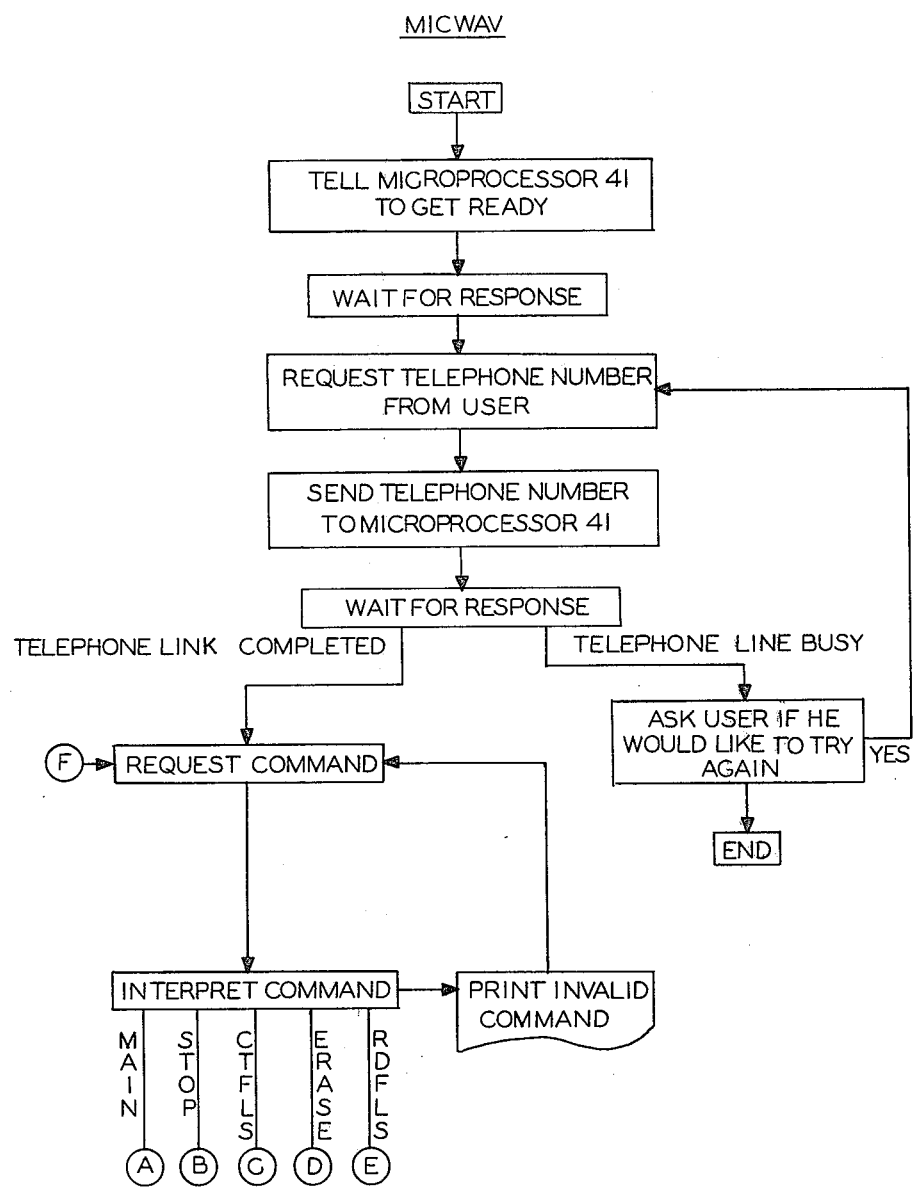
FIGS. 14 to 19 are flowcharts of the "MICWAV" program.
Figure 15:
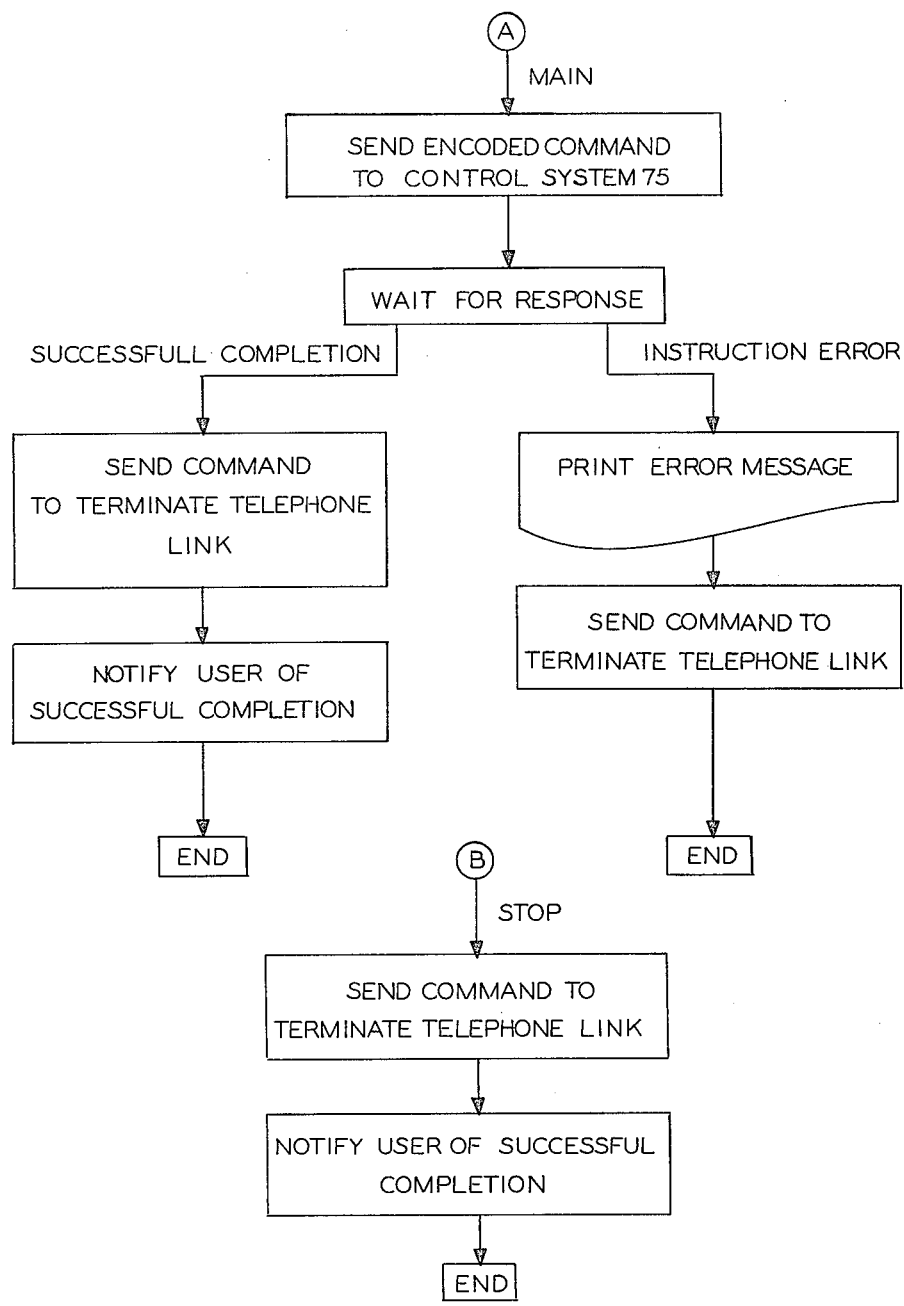
Figure 16:
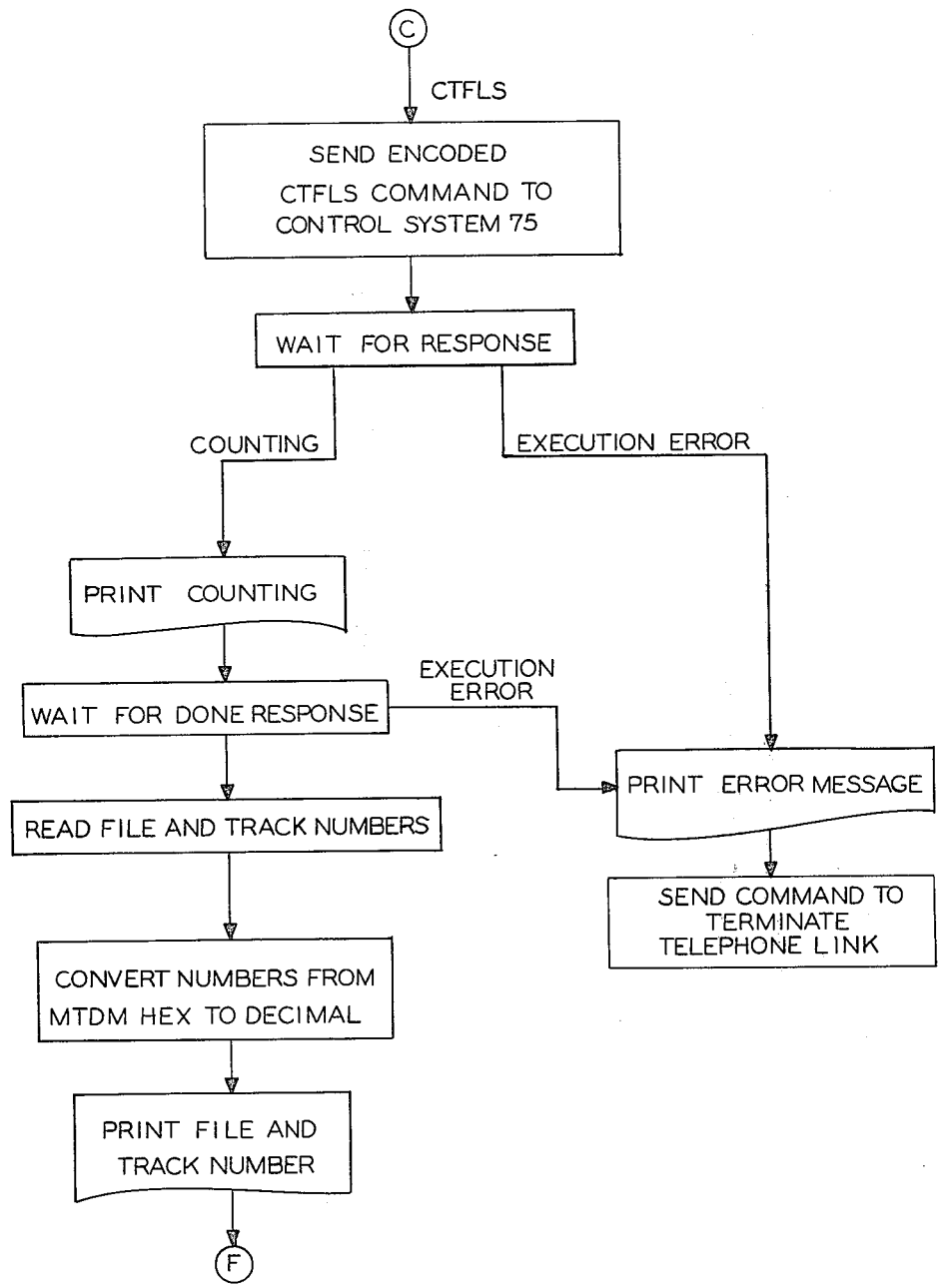
Figure 17:
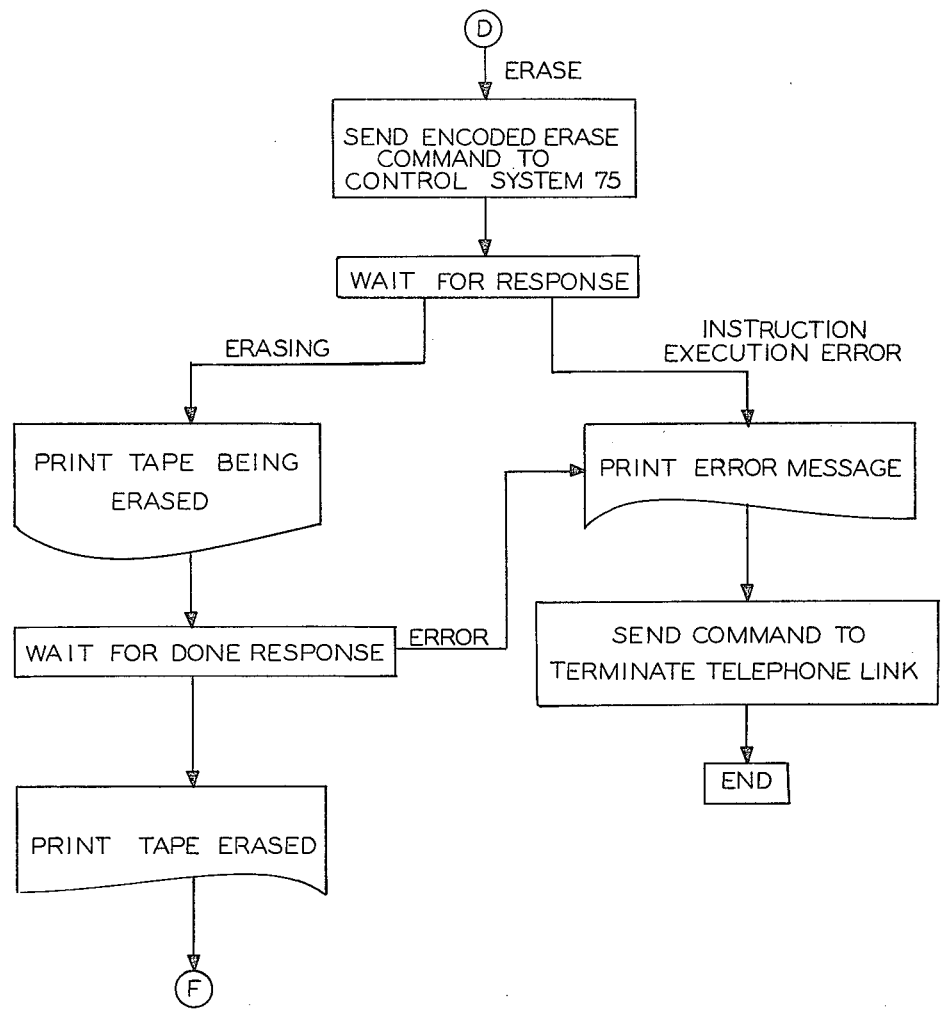
Figure 18:
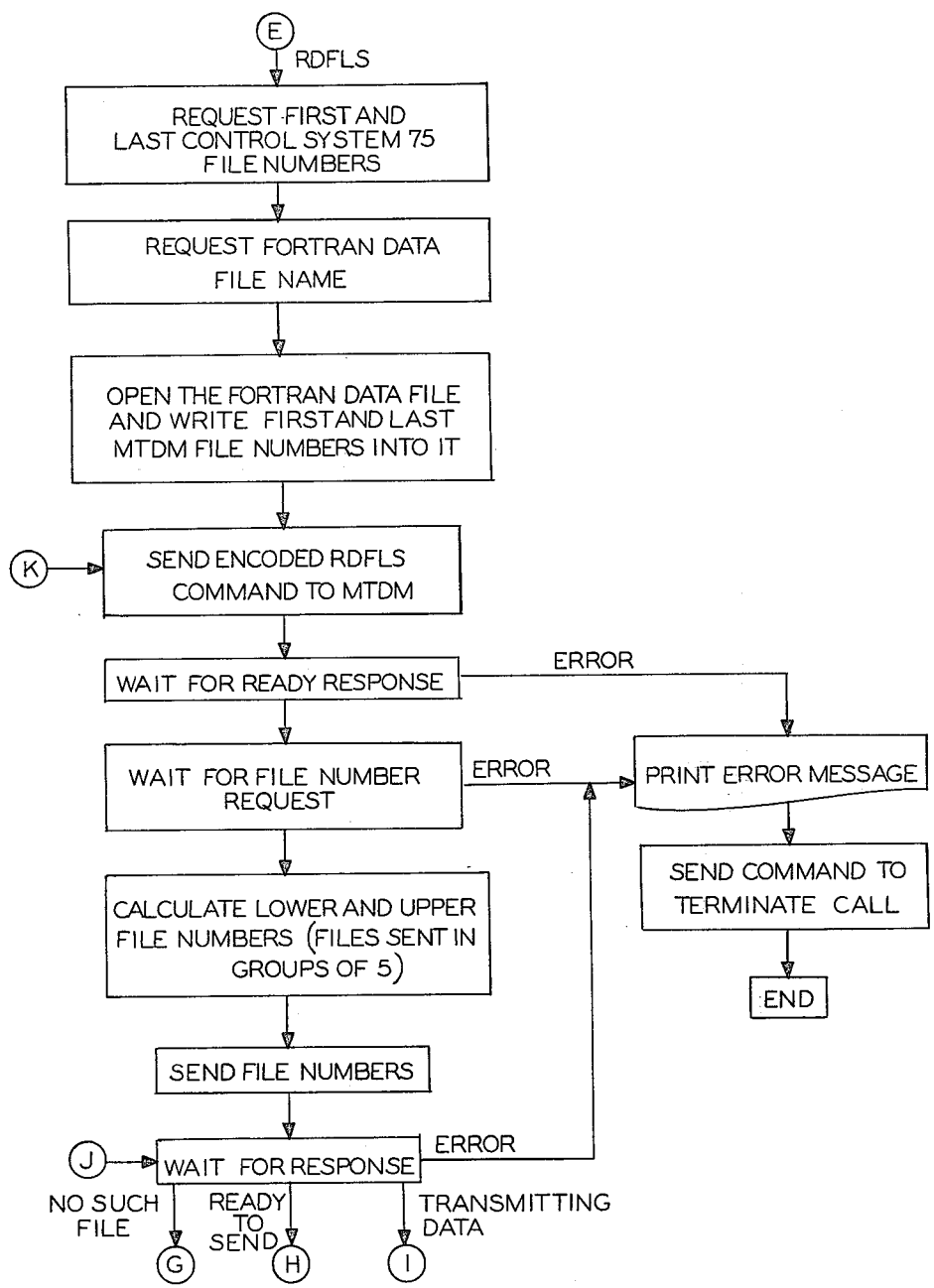
Figure 19:
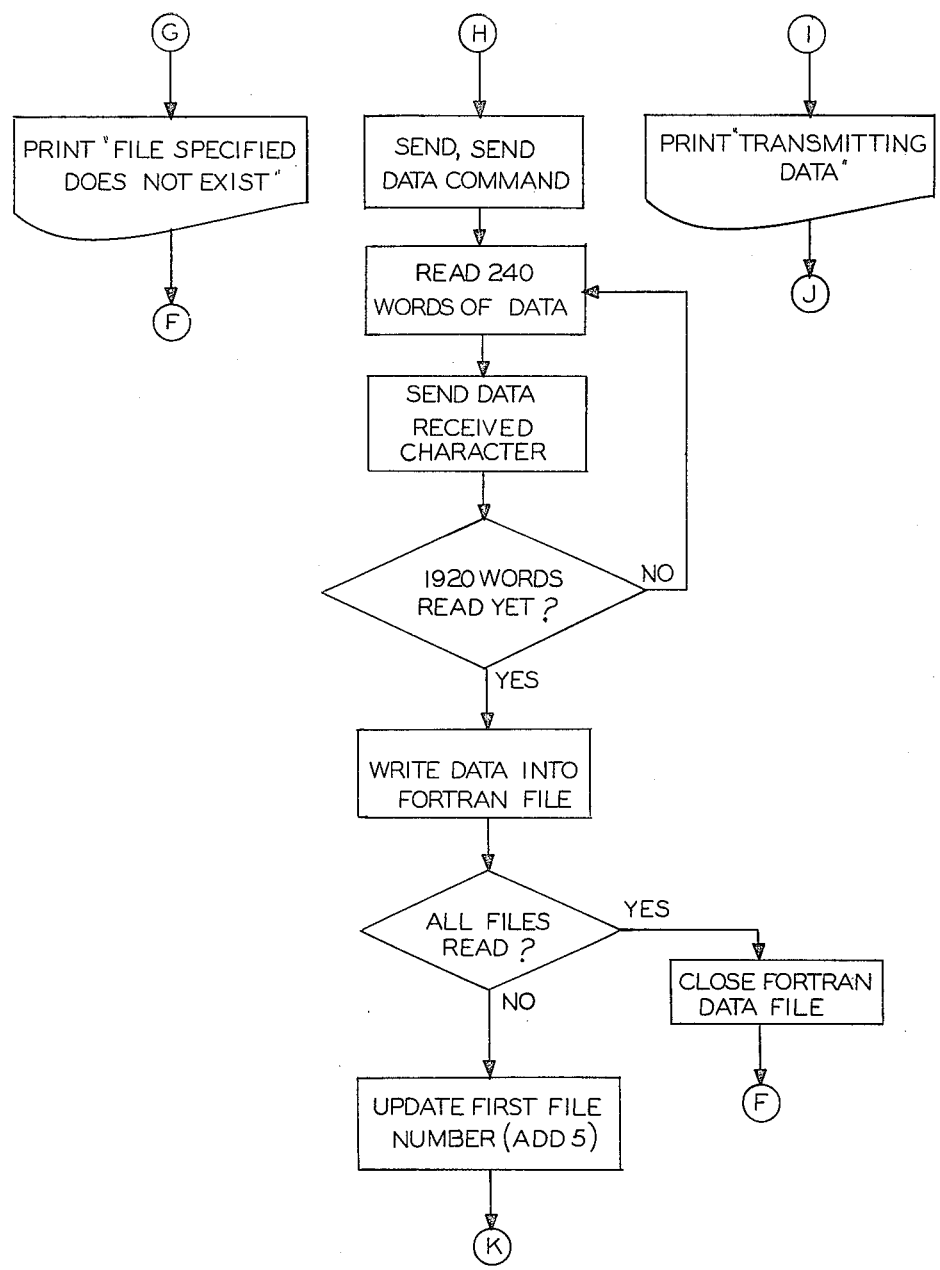

On the host computer 100 there are two Fortran programs, one which sends the commands and transfers the data called MICWAV (see FIGS. 14 to 19) and the second named ANLIZ (FIGS. 20 and 21) which analyzes the data. The flowchart for MICWAV is shown in FIG. 14. MICWAV begins by requesting the telephone number of the measuring system which can be entered as a ten digit number, if the call is local only seven digits are required. This number then directs an Autodialer connected to the host computer 100 to initiate the call. Upon completion of the telephone link, an acknowledgement is received from the measuring system and MICWAV requests the first instruction from the user. If for some reason the call cannot be completed (e.g., wrong number) the user is informed and asked if he would like to try again. After the user enters the first instruction MICWAV branches to the section of code which handles that instruction. If the command is invalid, a message to that effect is printed and another command is requested. During the execution of the commands, the user is kept informed of the status by various messages printed by the program. If an incorrect response is received from the measuring system, an error message is printed, the telephone link is terminated and the program ends. When execution of an instruction is completed, MICWAV requests another command from the user except in the case of STOP and MAIN which terminate the telephone link and end the program.

Figure 20:
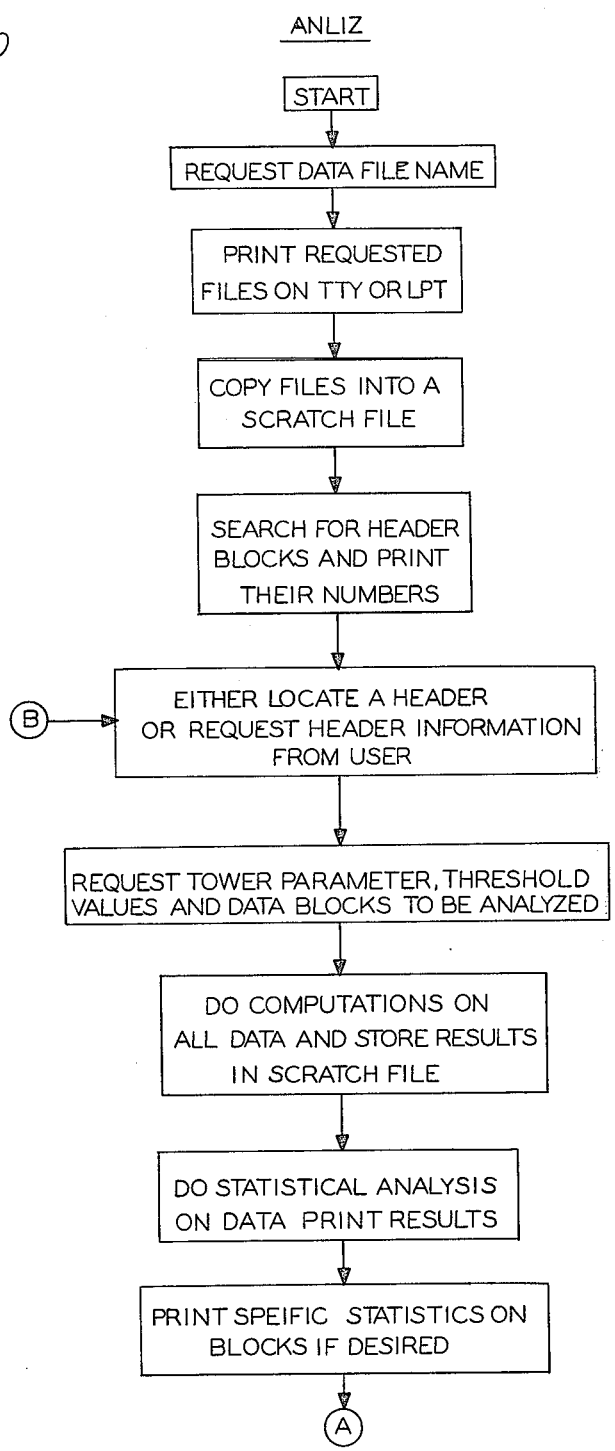
FIGS. 20 and 21 are flowcharts of the "ANLIZ" program.
Figure 21:
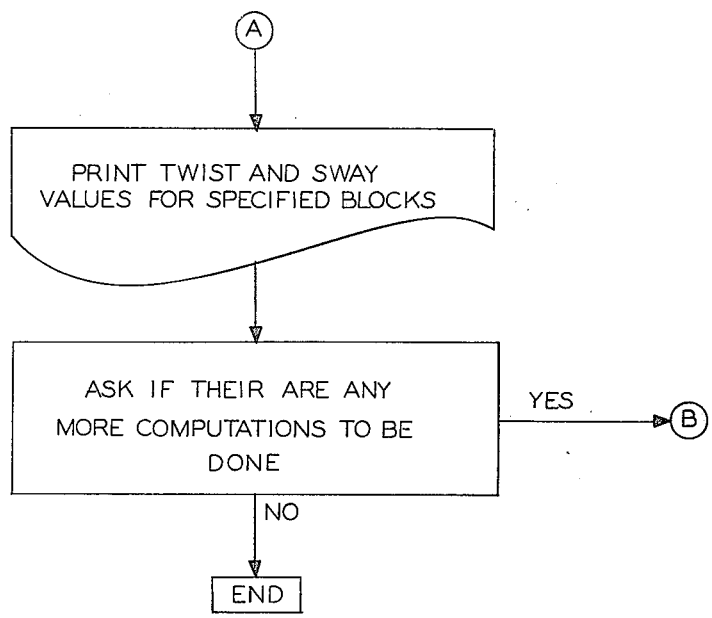

The second program on the host computer 100, ANLIZ, reads the data files created by MICWAV, formats them for output, computes the relevant tower movement quantities and does statistical analysis on large quantities of data. A general flowchart of ANLIZ is shown in FIGS. 20 and 21. The first part of the program prints the data either on a teletypewriter terminal (TTY) or line printer terminal (LPT) in a formatted form upon request. ANLIZ then asks the user if he would like to process the data, if so the data is copied into a scratch file and the locations of all header files are printed. The user then has the option of either using the information in one of the header files or entering this information by hand. After entering the measured parameters of the tower 10, twist and sway threshold values and the numbers of the files to be processed, the program begins its calculations. If during the calculations any file is found to have a twist or sway value outside of the specified thresholds, it is flagged by printing the file number and which threshold was exceeded. When the calculations on all files are completed the mean, average deviation and standard deviation for twist, sway, wind speed, accessory input, XT and YT are calculated and printed (XT and YT are the coordinates of the bisector of the line connecting the retroreflectors 22 and 23). In addition, a table showing the distribution around the mean value is printed. These statistics can also be printed for individual files if desired. Finally, if even more detailed information is needed, a list of the twist and sway values can be printed on the terminal or line printer for any of the files as indicated in the flow diagram of FIG. 21.

It is to be understood that the embodiments described herein are merely illustrative of the principles of the invention. Various modifications may be made thereto by persons skilled in the art which will embody the principles of the invention and fall within the sprit and scope thereof.

What is claimed is:

1. A method for dynamically determining the twist and sway of a microwave radio tower, comprising the steps of:
   (a) directing a laser beam at a first galvanometer controlled rotatable mirror positioned proximate the base of the tower;
   (b) reflecting the beam from the first mirror to a second galvanometer controlled rotatable mirror having an axis of rotation orthogonal to that of the first mirror to scan an area in a plane which is substantially perpendicular to the axis of the tower, which plane contains a first and second retroreflector fixedly mounted, in spaced relation, on the tower;
   (c) searching the area by scanning said plane with the laser beam in a predetermined pattern;
   (d) reflecting the beam over the same path from whence it came from the beam impinges on the first retroreflector;
   (e) detecting the beam reflected from the first retroreflector to initiate interrogation of the galvanometer control apparatus to obtain the positions of the mirrors at the time the beam was reflected by the first retroreflector;
   (f) processing the positional information of the mirrors to determine the direction of the beam impinging on the first retroreflector;
   (g) repeating steps (c), (d), (e) and (f) to determine the direction of the beam impinging on the second retroreflector;
   (h) calculating the position of the first and second retroreflectors based upon the laser beam directions determined in steps (f) and (g); and
   (i) determining the twist and sway of the tower using the position of the first and second retroreflectors.

2. The method set forth in claim 1 wherein the scanning step (c) is characterized by:
   scanning said area until the laser beam impinges on the first retroreflector; and
   moving the beam a predetermined distance to scan a second area which contains only the second retroreflector.

* * * * *

UNITED STATES PATENT AND TRADEMARK OFFICE
CERTIFICATE OF CORRECTION

PATENT NO. : 4,334,775

DATED : June 15, 1982

INVENTOR(S) : J. D. Breecher - B. E. Truax

It is certified that error appears in the above—identified patent and that said Letters Patent is hereby corrected as shown below:

In the specification, the following corrections should be made throughout the patent: "$R_1'$" should read --$R'_1$--; "$R_2'$" should read --$R'_2$--; "$Y_1'$" should read --$Y'_1$--; "$Y_2'$" should read --$Y'_2$--; "$X_1'$" should read --$X'_1$--; and "$X_2'$" should read --$X'_2$--. Column 2, line 53, "corner-tube" should read --corner-cube--. Column 4, Equation (6), "$S=\{(X_C-X_C')^2+(Y_C-Y_C')^2\}1/2$" should read --$S = \{(X_C - X'_C)^2 + (Y_C - Y'_C)^2\}1/2$--. Column 7, line 20, "galvonometers" should read --galvanometers--. Column 8, line 18, "reaily" should read --readily--; line 21, "30" should read --+5--; line 41, "threshold" should read --threshold is--; line 44, "A-to-d" should read --A-to-D--; line 65, "the capability" should read --that capability--. Column 10, line 21, "if value" should read --if a value--; line 28, after "any" it should read --movement of the retroreflectors 22 and 23 towards the--; line 29, "regarding" should read --reducing--; line 53, "Wintex" should read --Wintek--. Column 12, line 16, "sprit" should read --spirit--.

UNITED STATES PATENT AND TRADEMARK OFFICE
CERTIFICATE OF CORRECTION

PATENT NO. : 4,334,775

DATED : June 15, 1982

INVENTOR(S) : J. D. Breecher - B. E. Truax

It is certified that error appears in the above—identified patent and that said Letters Patent is hereby corrected as shown below:

In the claims, Claim 1, Column 12, line 35, "beam over" should read --beam back over--; line 36, "from" should read --when--.

Signed and Sealed this

Eighth Day of February 1983

[SEAL]

Attest:

Attesting Officer

GERALD J. MOSSINGHOFF

Commissioner of Patents and Trademarks